Dec. 20, 1955   H. B. ALBERS   2,727,556
STRAIGHTENING MECHANISM
Filed Nov. 4, 1954   5 Sheets-Sheet 1

Dec. 20, 1955   H. B. ALBERS   2,727,556
STRAIGHTENING MECHANISM
Filed Nov. 4, 1954   5 Sheets-Sheet 2

Dec. 20, 1955  H. B. ALBERS  2,727,556
STRAIGHTENING MECHANISM
Filed Nov. 4, 1954  5 Sheets-Sheet 3

Dec. 20, 1955  H. B. ALBERS  2,727,556
STRAIGHTENING MECHANISM
Filed Nov. 4, 1954  5 Sheets-Sheet 4

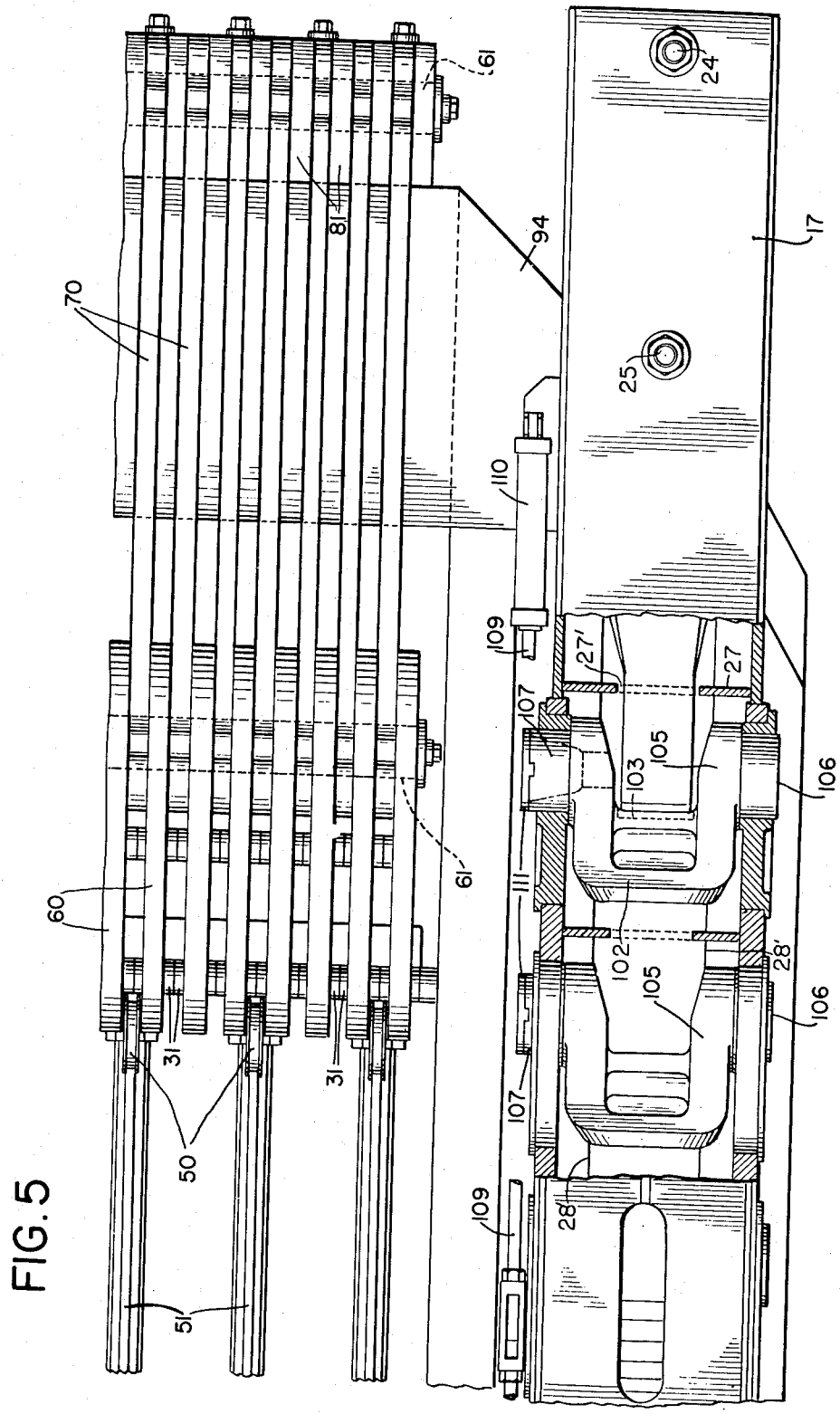

United States Patent Office 2,727,556
Patented Dec. 20, 1955

2,727,556

STRAIGHTENING MECHANISM

Heinrich B. Albers, Malverne, N. Y., assignor, by mesne assignments, to Hydropress Incorporated, New York, N. Y., a corporation of Delaware Application November 4, 1954, Serial No. 466,880

3 Claims. (Cl. 153—35)

This invention relates to mechanism for straightening elongated metal plates, sheets or shapes which have become bent or warped along their longitudinal axes after being rolled or extruded. These mechanisms effect straightening of such products by stretching the material beyond the elastic limit. The conventional stretching machine comprises a frame on which two gripping heads are mounted. One of these heads is adjustably secured to the frame so that objects of various lengths may be accommodated in the machine. Hydraulic pressure is applied to the other gripping head to move it away from the secured gripping head, and thus subject to high tensile force the object being stretched. While tension is developed in the stretched object, compression forces will be set up in the frame.

As stated above, one of the gripping heads is adjustably secured to the frame to accommodate objects of various lengths. Such adjustment has heretofore been effected by providing the adjustable gripping head with a transverse hole therethrough adapted to be brought into coincidence with one of a series of holes provided in the frame. When the desired position was reached, a pin was passed through the hole in the frame which coincided with the hole in the adjustable gripping head. It will readily be appreciated that it was a difficult matter to align the holes in exact coincidence, particularly in the case of large stretching machines where the adjustable gripping head was correspondingly large and heavy. For this reason the pins which were to be inserted in the coincident holes were usually made oval-shaped or of slightly smaller diameter than the holes. In either case there resulted line contact between the pin and the holes with correspondingly rapid wear.

It is therefore one of the principal objects of this invention to provide means for securing the adjustable gripping head in adjusted position without the necessity of fine alignment between the head and any point on the frame.

It is a further object of the invention to provide means for securing the adjustable gripping head in the frame by providing contact over a large surface area to avoid undue wear such as would occur if there were only line contact.

The largest stretching machines heretofore employed developed tensile force on the order of 2500 tons. However, the demand is now for machines which can develop 8000 tons and more. This has created a special problem in the design and construction of gripping heads which must in the first instance take up these forces. It is therefore another object of this invention to provide gripping heads capable of taking up the highest forces now required in stretching machines.

As stated hereinbefore, the frame is subject to high compression stresses corresponding to the large tensile forces developed in the object being stretched. If the frame extends only underneath the operating level, the stretching forces will act eccentrically on the frame resulting in additional high bending stresses. It has been proposed to provide a horizontal column at each side of the frame to take up the load, but such construction tended to obstruct lateral loading and unloading of the material to be stretched. It is therefore another object of this invention to provide a frame structure capable of taking up the large forces which are transmitted thereto and distributing said forces evenly, while at the same time offering unobstructed access to the machine from top and sides for loading and unloading of material.

Further objects and advantages of this invention will become apparent in the following detailed description thereof.

In the accompanying drawings,

Fig. 5 is a plan view of the mechanism disclosed in Fig. 4.

Figure 1:
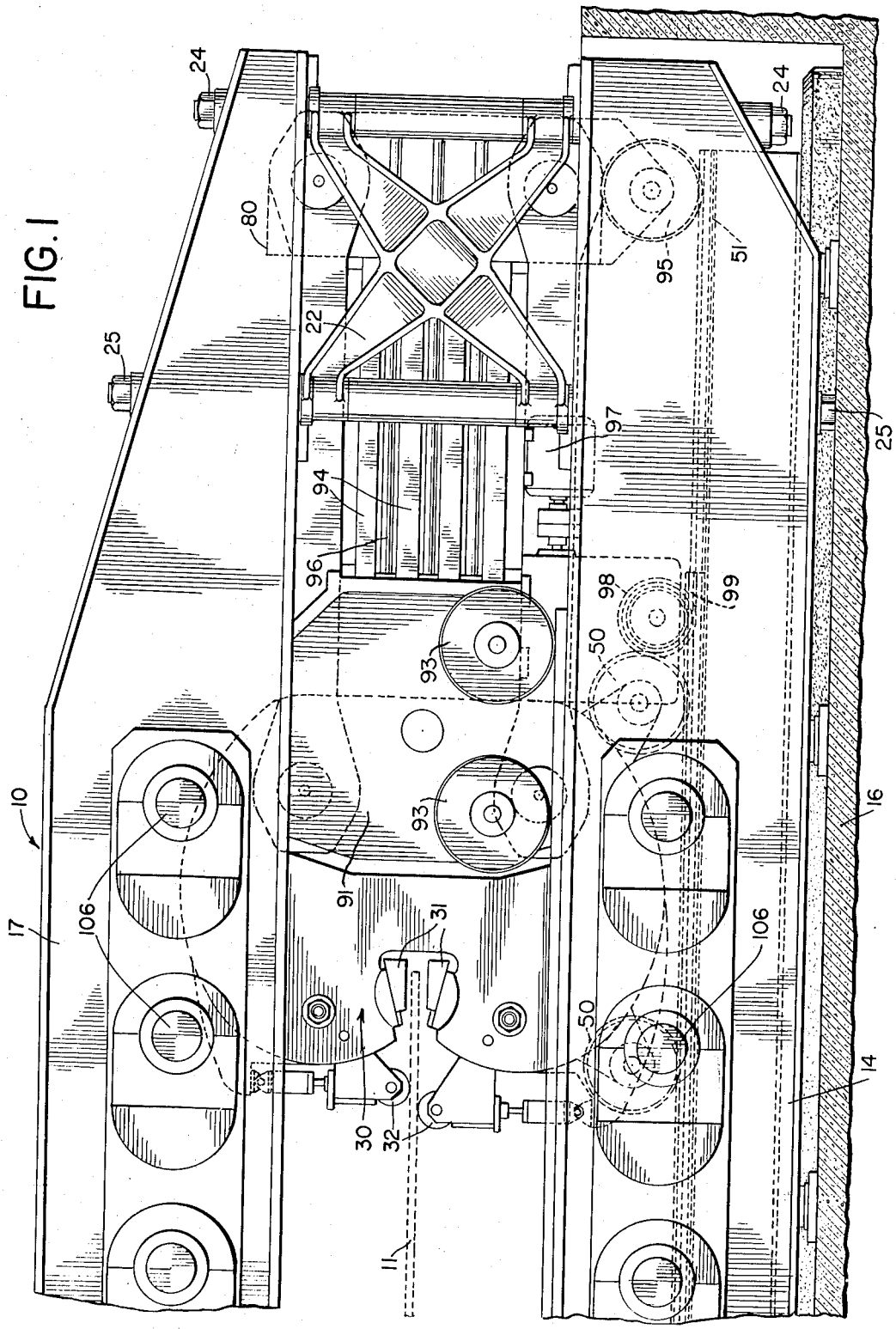
Fig. 1 is a front elevation of the right hand portion of a stretching machine embodying this invention.
Figure 2:
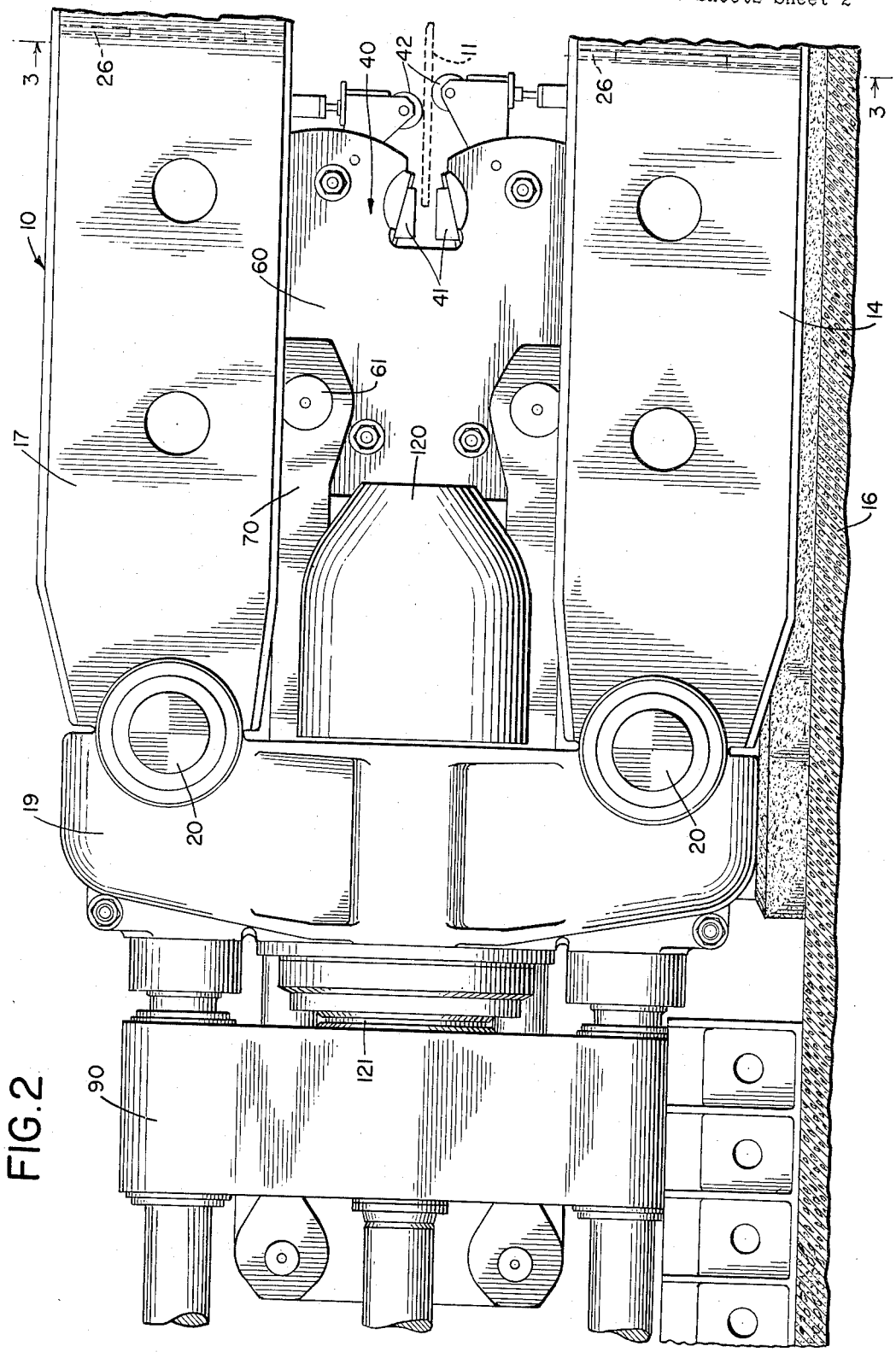
Fig. 2 is a front elevation of the left hand portion of the stretching machine.

Referring to Figs. 1 and 2 of the drawings, there is disclosed a stretching machine for straightening plates or sheets 11, which for the purpose of better illustration has been broken into two parts, the right-hand or rear part of the machine being shown in Fig. 1 while the left-hand or front part of the machine is shown in Fig. 2. As so illustrated, the machine comprises a frame indicated generally at 10 and formed by a pair of lower laterally spaced horizontal columns or girders 14 and 15 resting upon a floor or base 16, and a pair of upper horizontal columns or girders 17 and 18 spaced vertically from girders 14 and 15 but in alignment with the respective lower girders. There is thus provided a rectangular arrangement of girders which permits access to the interior of the frame from either side and from above, without encountering any obstruction due to the frame structure. The girder members are held in spaced relation laterally and vertically by a cross-head 19 and connections 20 at the forward end, and by spacer members 22 and bolts 24, 25 at the rear end.

Figure 3:
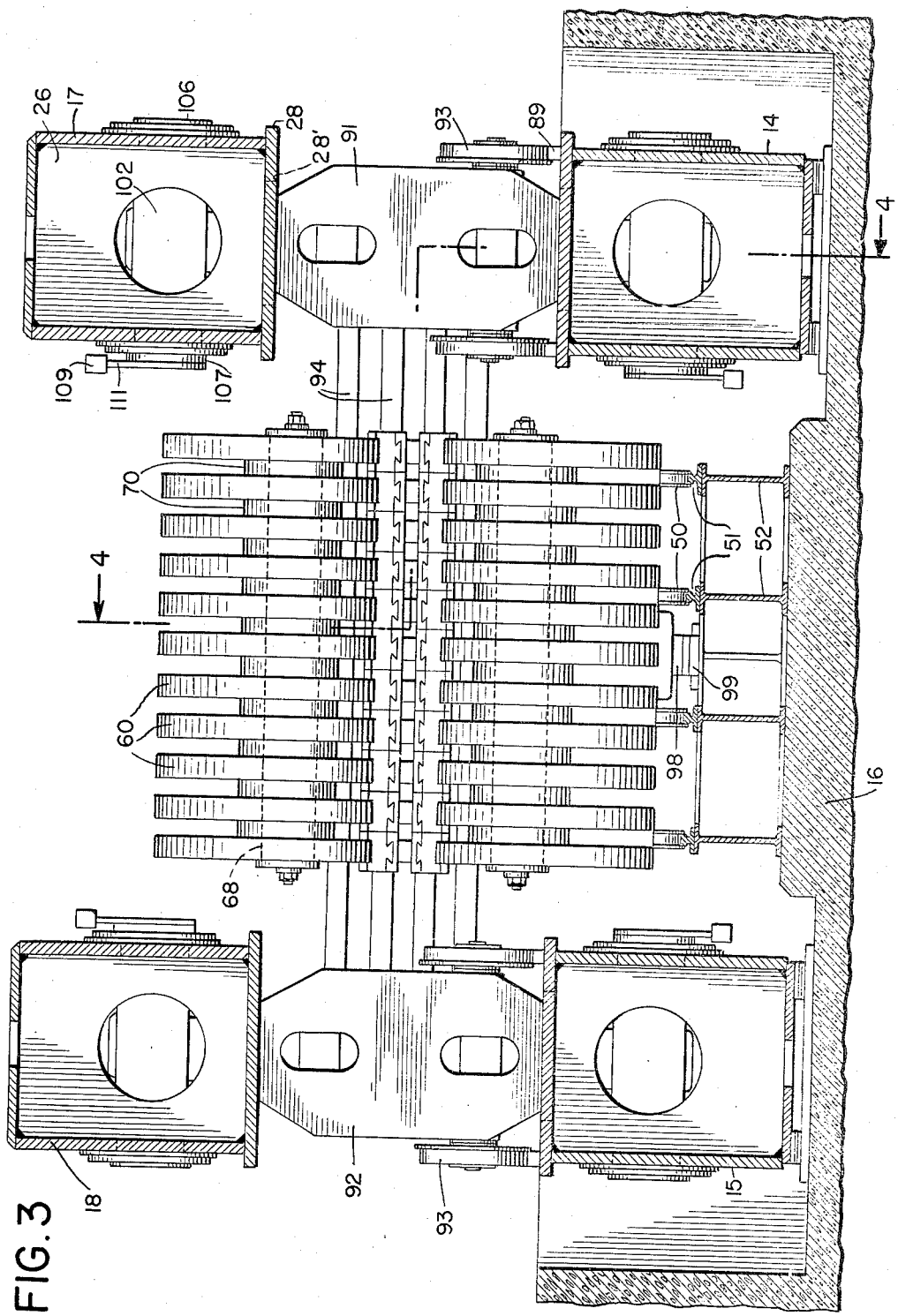
Fig. 3 is a section taken on the line 3—3 of Fig. 2.
Figure 4:
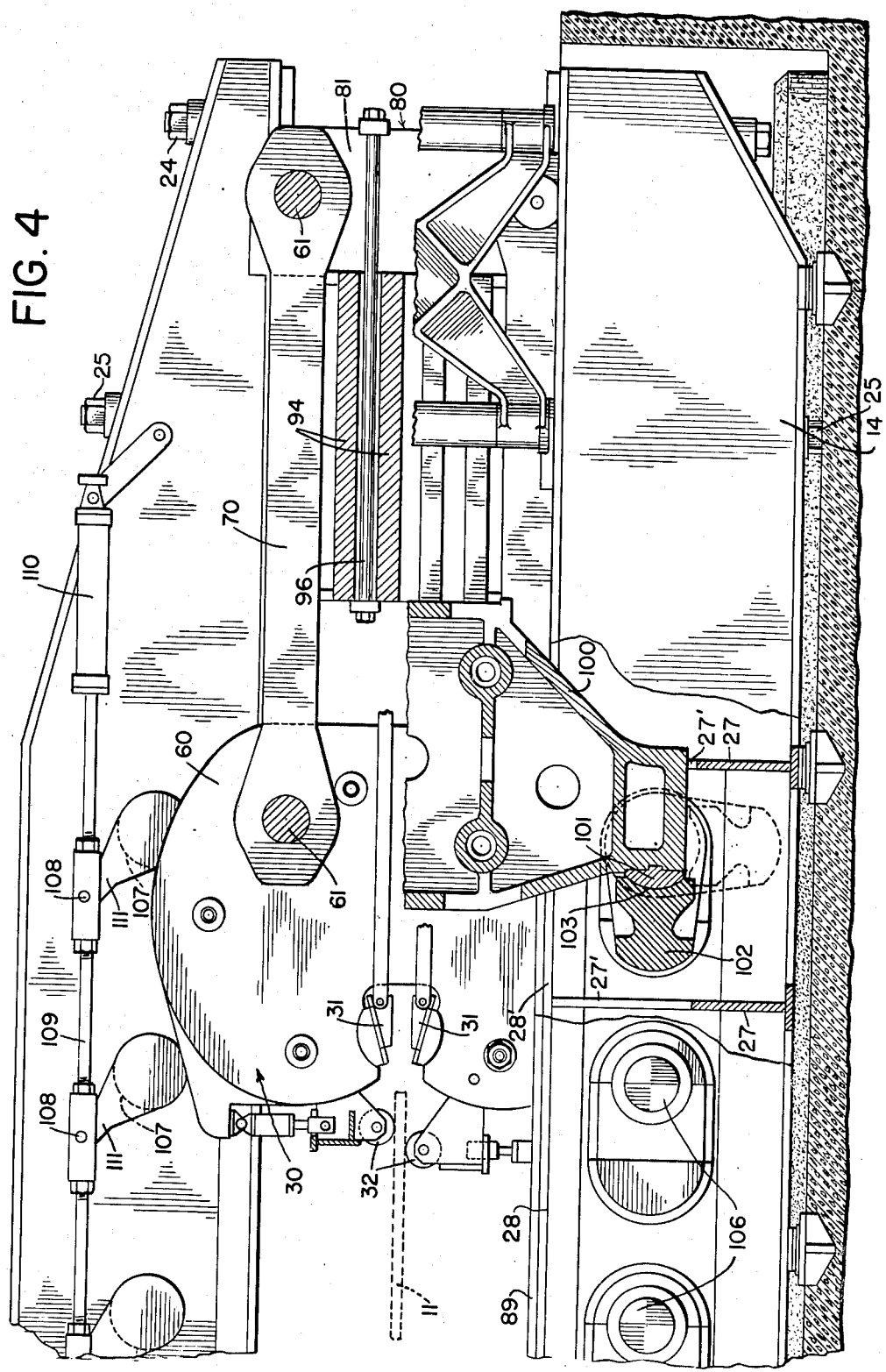
Fig. 4 is a vertical section through the Fig. 1 portion of the machine taken along line 4—4 of Fig. 3.

Each girder is of welded box type construction and reinforced by internal apertured plates 26 (Figs. 2 and 3) in the front part of the machine, and internal plates 27 in the rear part of the machine, each plate 27 having a slot as indicated at 27' (Figs. 4 and 5). Each girder comprises a plate 28 which has a longitudinal slot 28' (Figs. 3, 4 and 5) extending along the rear part of the machine.

Within the space provided by the laterally displaced members 14, 17 and 15, 18 of the frame there operate two gripping heads generally indicated at 30 and 40, each provided with gripping jaws 31, 41 and with guide rollers 32, 42. The gripping head 30 is adapted to be adjustably secured or locked to the frame 10 by means to be described hereinafter, while the gripping head 40 is forced away from gripping head 30 (after the material 11 to be stretched has been mounted in the gripping heads) by hydraulic pressure means which will also be more fully described. The weight of the gripping heads is supported on the base 16 by means such as wheels 50 riding upon rails 51 on beams 52 resting on the base.

In straightening machines where forces on the order of 8000 tons are developed, gripping heads as they were heretofore constructed would not be capable of withstanding such forces. By the design disclosed herein, gripping heads are able to withstand forces of this magnitude or greater. For this purpose each gripping head is constructed of a plurality of plates 60 spaced apart to accommodate links 70 (see Figs. 3 to 5). The whole assembly of plates and links is fastened together by rods 61. The links of gripping head 30 extend rearwardly to a cross-head 80, while the links of gripping head 40 extend forwardly to a movable cross-head 90. Crosshead 80 consists of plates 81 (Fig. 5) interleaved with the links 70 and tied together by the rods 61. The cross-heads 19 and 80 transmit the stretching forces to the frame 10 in a manner to be described hereinafter. The laminated structure of the gripping heads vastly increases the forces to which these heads can be subjected as compared to gripping head structures heretofore employed.

Assuming that a plate to be stretched is gripped at one end in head 40 to which the stretching pressure is to be applied, it is obvious that in order for the machine to accommodate plates which vary substantially in length the gripping head 30 must be made adjustable relative to frame 10, and locked to said frame in adjusted position. The unsatisfactory conventional arrangement of providing a hole in the adjustable head adapted to be brought into registry with a series of holes in the frame to receive a locking pin, has been described in the introduction hereto. The adjustable means here employed dispenses with the pin and hole construction and substitutes therefor the following mechanism. As described, the gripping head 30 is connected to cross-head 80 by the series of links 70 interleaved with the plate laminations 60 and 81. Forces thus transmitted to cross-head 80 are in turn transmitted to locking heads 91 and 92 which ride upon rails 89 on the lower columns 14 and 15 by means of wheels 93. The connection between cross-head 80 and the locking heads is made by a series of laminations in the form of horizontally disposed plates 94 (see Figs. 1, 3, 4 and 5) which extend from locking head 91 across the head 80 to the other locking head 92 between the upper and lower series of links 70 and are tied to crosshead 80 by means of bolts 96 (Fig. 4) and rigidly connected to the locking heads by suitable means (not shown). The cross-head 80 is provided with supporting wheels 95 riding upon rails 51 in the base. For moving gripping head 30, cross-head 80 and locking heads 91 and 92 as a unit to adjusted position, there may be provided a reversible electric motor 97 mounted on the assembly and adapted to drive a gear 98 meshing with a rack 99 on the base.

For locking the assembly in adjusted position to the frame there are provided on each locking head 91 and 92 depending portions 100 extending downwardly and upwardly into the respective frame girders 14, 15, 17, 18, said girders being of hollow construction. The slots 27', 28' serve to accommodate the depending portions 100 and permit travel thereof along the rear part of the machine. Each depending portion 100 is provided with an abutment such as a buffer 101 in the form of a pad having an external arcuate contact surface which is adapted to engage the next of a plurality of stops 102 each of which has a complementary external contact surface 103 for receiving buffer 101. The stops 102 are movable to effective and ineffective positions, and are adapted to be maintained in ineffective positions until the gripping head 30 and its associated members have been moved to approximately the desired position where the gripping head 30 can conveniently engage the length of material to be stretched. The stops 102 are then operated to their effective positions in the path of buffers 101. The gripping head assembly is then moved forward until the buffers engage the first stop in their path. The application of hydraulic pressure to gripping head 40 will only cause each buffer 101 to engage its cooperating bearing surface 103 more firmly. By this arrangement it will be seen that the use of pins and cooperating holes in gripping head and frame is avoided.

For moving the stops 102 to effective (operative) and ineffective (inoperative) positions the following means may be employed. The stops may take the form of crank portions 102 (Figs. 4 and 5) of crankshafts having arms 105 and journal portions 106, 107 mounted for rotation in the respective girders 14, 15, 17 and 18 at a succession of positions. Fixed to each journal portion 107, preferably along the inside faces of girders 14, 15, 17 and 18, is a link 111 (Fig. 4), and said links are pivotally connected at 108 to a push bar 109 which may be operated from a hydraulic motor 110. Movement of the bar in one direction will therefore operate all stops to effective positions, while movement of the bar in the opposite direction will operate all stops to ineffective positions.

The head 30 is first adjusted for the length of the object which is then gripped at its ends. Hydraulic pressure is next applied for the purpose of moving head 40 forwardly while head 30 is held locked in adjusted position. For moving head 40, hydraulic pressure may be supplied to a pair of cylinders 120 (Fig. 2) mounted on each side of fixed cross-head 19, to move forwardly a pair of rams 121 and movable cross-head 90 connected thereto. This carries forwardly links 70 and cross-head 40 connected thereto.

Having described my invention, what I claim and desire to secure by Letters Patent is:

1. In a stretching machine comprising a frame, a pair of gripping means movable longitudinally in said frame, locking means for securing one of said gripping means to the frame in adjustable position, and means for applying pressure to the other of said gripping means to move it away from the adjustable gripping means, said locking means comprising an abutment movable with the adjustable gripping means and having an external contact surface, a plurality of stops carried by the frame longitudinally thereof, each of said stops having an external contact surface adapted to engage the external contact surface of the abutment, and means for mounting said stops for movement to effective and ineffective positions, the effective position of said stops being arranged in the path of movement of the abutment.

2. In a stretching machine comprising a frame having a pair of horizontal girders, a pair of gripping heads movable longitudinally in said frame, means for securing one of said heads to the frame in adjustable position, and means for applying pressure to the other head to move it away from the adjustable head, said securing means comprising locking means supported on each of said girders for longitudinal movement, means connecting said adjustable head to the locking means, each of said locking means comprising a buffer rigidly connected thereto; a plurality of stops carried by each girder longitudinally thereof, each of said stops having an external contact surface adapted to engage the respective buffer, and means for mounting said stops for movement to effective and ineffective positions, the effective position of said stops being arranged in the path of movement of the respective buffer.

3. A stretching machine as specified in claim 2, in which each of the girders is hollow, the stops being mounted in the hollow interiors of the girders, each stop being in the form of a crankshaft journaled at both ends in the girder and having a crank portion therebetween, and said buffers extending into the respective interiors between the crankshaft journals to engage said crank portion.

References Cited in the file of this patent

UNITED STATES PATENTS

| Re. 10,191 | Tewskbury | Aug. 29, 1882 |
| 725,584 | Pocher | Apr. 14, 1903 |
| 1,595,004 | Haight | Aug. 3, 1926 |
| 1,795,215 | Kent | Mar. 3, 1931 |
| 1,865,070 | Amsler | June 28, 1932 |
| 1,903,638 | Sykes | Apr. 11, 1933 |
| 2,315,971 | Lake | Apr. 6, 1943 |
| 2,453,576 | Jacob | Nov. 9, 1948 |

FOREIGN PATENTS

| 2,434 | Austria | Oct. 10, 1900 |
| 9,137 | Great Britain | Apr. 18, 1906 |
| 142,192 | Great Britain | Apr. 29, 1920 |